United States Patent
Hirdina

(10) Patent No.: US 8,778,241 B2
(45) Date of Patent: Jul. 15, 2014

(54) METHOD FOR CONVERTING A BLOW MOLDING MACHINE AND BLOW MOLDING MACHINE

(75) Inventor: Jochen Hirdina, Regensburg (DE)

(73) Assignee: Krones AG, Neutraubling (DE)

( * ) Notice: Subject to any disclaimer, the term of this patent is extended or adjusted under 35 U.S.C. 154(b) by 403 days.

(21) Appl. No.: 12/826,844

(22) Filed: Jun. 30, 2010

(65) Prior Publication Data

US 2010/0327474 A1 Dec. 30, 2010

(30) Foreign Application Priority Data

Jun. 30, 2009 (DE) .......................... 10 2009 031 154

(51) Int. Cl.
 *B28B 7/04* (2006.01)
(52) U.S. Cl.
 USPC ............................................................. 264/39
(58) Field of Classification Search
 USPC .......................................................... 264/39
 See application file for complete search history.

(56) References Cited

U.S. PATENT DOCUMENTS

| | | | |
|---|---|---|---|
| 4,151,250 A | 4/1979 | Barry et al. | |
| 4,233,022 A | 11/1980 | Brady et al. | |
| 4,850,850 A | 7/1989 | Takakusaki et al. | |
| 5,411,698 A * | 5/1995 | Mero et al. | 264/521 |
| 6,991,756 B2 | 1/2006 | Saeki et al. | |

FOREIGN PATENT DOCUMENTS

| | | |
|---|---|---|
| CN | 1148827 A | 4/1997 |
| CN | 101065235 A | 10/2007 |
| CN | 101360600 A | 2/2009 |
| DE | 4242024 A1 | 6/1994 |
| EP | 1514667 A1 | 3/2005 |
| JP | 52102380 A | 8/1977 |
| JP | 3222714 A | 10/1991 |
| JP | 9085420 A | 3/1997 |

OTHER PUBLICATIONS

DuPont, "Blow Moulding Processing Manual" Apr. 1999.*
Notification of First Office Action, The State Intellectual Property Office of the People's Republic of China, Application No. 201010221422.3, dated Sep. 10, 2012.

* cited by examiner

*Primary Examiner* — Larry Thrower
(74) *Attorney, Agent, or Firm* — Marshall, Gerstein & Borun LLP

(57) ABSTRACT

A method for converting a blow molding machine with a plurality of rotatingly movable molds heated to a heat-set operating temperature, due to mold change, having at least one simulated work cycle carried out in the blow molding machine with molds left empty, and a cooling medium then simultaneously supplied to all mold cavities from the outside so as to cool the molds in comparison with the heat-set operating temperature. In a machine control the blow molding machine has a program routine for performing at least one simulated work cycle with empty molds and at a reduced rotational speed of the molds with external supply of a cooling medium into the molds.

14 Claims, 1 Drawing Sheet

METHOD FOR CONVERTING A BLOW MOLDING MACHINE AND BLOW MOLDING MACHINE

CROSS-REFERENCE TO RELATED APPLICATION

The present application claims the benefit of priority of German Application No. 102009031154.8, filed Jun. 30, 2009. The entire text of the priority application is incorporated herein by reference in its entirety.

FIELD OF THE DISCLOSURE

The present disclosure relates to a method and to a blow molding machine.

BACKGROUND

In heat-set blow molding machines, e.g. for PET bottles for beverages to be filled in a hot state, the molds are additionally heated up by temperature control devices with a heat carrier medium to a heat-set operating temperature. For converting the heat-set blow molding machine to a different type of bottle the molds must be exchanged. A heat-set blow molding machine contains, for example, at least eight molds, or up to thirty molds or more. The heat-set operating temperature may be about 130° C. to 180° C., so that upon a mold change one must first wait until the molds have cooled down to a handling temperature of e.g. 40-60° C. Although the molds are cooled by the further conveyed and no longer heated heat-carrier medium of the temperature control devices, it takes at least about half an hour until the molds have cooled down to about 60° C. and can be exchanged, and more than one hour until the molds have cooled down to about 40° C. and can be exchanged. A mold change is therefore tantamount to a high production loss. If stretch blow molding is carried out in the heat-set blow-molding machine, a stretch type purge rod or stretching rod is introduced into each mold; the rod mechanically pre-stretches the preform in the mold during a normal work cycle and supplies the blow air over a defined portion of the normal work cycle so as to bring the pre-stretched preform into the bottle form. Optionally, before the bottle is removed from the mold, purge air is also blown in for a short period so as to be able to remove the bottle in a dimensionally stable manner. As a rule, however, every mold is cooled in preparation of a change only by the still circulating and no longer heated heat carrier of the temperature control devices.

It is known from JP 3222714 that for a faster solidification of a molding in a mold and for shortening the cycle time heating is first carried out with gas, and then cooling.

It is known from JP 9085420 A that a metal mold is cooled with cooling water during the molding operation.

It is known from U.S. Pat. No. 6,991,756 B1 that a heat-exchange apparatus is internally assigned to a metal mold so as to guide either a liquid, hot or cold heat carrier through heat exchange passages of the mold and to purge the respective heat carrier with purge air during transition from the hot to the cold heat carrier.

Finally, it is known from DE 4242024 C2 that a mold for plastic processing is held with a liquid at operating temperature in channels separated from the mold cavity and to solidify plasticized plastics introduced at an elevated temperature and to remove liquid contained in the channels with compressed air prior to a mold change.

SUMMARY OF THE DISCLOSURE

It is an aspect of the present disclosure to indicate a method of the aforementioned type as well as a blow molding machine for minimizing production loss caused by conversion due to a mold change.

It is the basic idea not to shut off the blow molding machine and wait until the molds have cooled down to a sufficient degree, but to carry out forced cooling in at least one simulated work cycle by removing heat from the mold cavity surface with the help of an externally supplied cooling medium.

According to the method each heat-set mold is optionally cooled not only by the heat carrier of the temperature control devices that is circulating through the mold without any further heat supply, but in addition during at least one simulated work cycle by externally supplied cooling medium that efficiently removes heat from the mold via the mold cavity surface and discharges said heat. Surprisingly, the waiting period until the molds have reached temperatures suited for handling can be reduced by about half the time or even more, whereby production loss caused by conversion due to mold change is minimized. At least one simulated work cycle is here carried out with empty molds so that all molds are cooled evenly and simultaneously, and drive and movement control mechanisms of the blow molding machine that exist at any rate can here be used in a profitable way. The only additional measure that is needed consists in providing and introducing the cooling medium in a sufficient quantity, optionally at an increased pressure intensifying the cooling action and at a corresponding feed rate. These additional efforts, however, are negligible with respect to the achievable minimization of the production loss. The heat discharge by means of the cooling medium from the mold cavity surface is surprisingly efficient, and flow paths to the mold cavity that exist at any rate can be used without significant modifications on the molds or the further equipment of the blow molding machine for the additional cooling operation. As an alternative, the cooling medium could also circulate in supply and/or discharge paths only provided for forced cooling, by means of a conveying device that is also provided for this purpose alone. According to the method a plurality of simulated work cycles are carried out in successive order, if necessary, with the blow molding machine continuing to run "empty" until the mold temperature desired for the mold change has been reached.

Apart from equipment provided at any rate, the blow molding machine needs substantially only a program routine in the machine control to carry out at least one simulated work cycle with empty molds to prepare a converting process and to convey the cooling medium, optionally at the same time, into the mold cavities of all molds. Expediently, the at least one simulated work cycle with empty molds is here carried out at a rotational speed of the molds reduced in comparison with the normal work cycles and thus with a reduced energy input. Apart from this, the blow molding machine, particularly a heat-set stretch blow-molding machine, does possibly not require any significant modifications. The temperature control devices provided for the heat set blow-molding operation do not heat the heat carrier used for temperature control in the simulated work cycle because they are activated only for a normal work cycle or for heating, so that the additional cooling by the externally supplied cooling medium effects a rapid reduction of the mold temperature in comparison with the heat-set operating temperature, and the molds can already be exchanged after a very short period. For instance, ambient air is used for cooling on the mold cavity surface. The ambient air can optionally be cooled in an active way to enhance the cooling effect. Alternatively, a liquid cooling medium, such as cooling water, could also be used, or a mixture of gaseous and liquid cooling media, e.g. in aerosol form, to intensify the cooling effect by removal of evaporation heat from the mold cavity surface.

In an expedient variant of the method, the cooling medium is supplied in a blow molding machine, which is configured as a stretch blow molding machine, by the stretch type purging rod or stretching rod which is placed in the empty mold, e.g. permanently and at a high pressure or high throughput rate, and all of the molds cooled in this way are moved at a lower rotational speed in comparison with a normal work cycle. The supplied cooling medium flows out of the mold cavity e.g. through a space provided between the stretching rod and the mold in the empty state of the mold. Alternatively, or in addition, at least one relief valve could also be assigned to the mold, the valve being either opened during the simulated work cycle or being responsive to pressure, and permitting the outflow of the cooling medium at a delivery rate that is as great as possible, optionally under a biasing pressure intensifying the cooling action. It would also be possible to open the mold at least in part during the simulated work cycle so as to release additional outflow paths for the cooling medium. Optionally, the cooling medium is passed through the mold cavity in a specifically purposeful controlled manner at a high throughput rate when during the simulated work cycle, just like during the normal work cycle, each mold is opened and closed again during the rotating movement. The stretching rod is given an additional function for the simulated work cycle in that it conveys the cooling medium, distributed in the mold cavity and towards the mold cavity surface. In an expedient method variant the stretching rod is held substantially stationary in the mold cavity during the simulated work cycle in an optimal cooling position while the cooling medium is conveyed to achieve an optimal cooling effect. Hence, during the simulated work cycle the stretching rod is not reciprocated in the mold as is the case during the normal work cycle.

By contrast, in a different variant of the method, it may be expedient as an alternative to make use of the movement of the stretching rod relative to the mold, which movement is controlled at any rate in the normal work cycle for the blow molding of the container, so as to distribute the externally supplied cooling medium into the mold cavity.

In an expedient variant of the method, each simulated work cycle is carried out at a speed of the molds that is slower than during a normal work cycle. The rotational speed can be reduced considerably, so that only a small amount of drive energy is consumed. For instance, the simulated work cycle is carried out at a rotational speed of about 50 degrees/s over 360 degrees.

According to the method, it may further be of advantage when during cooling and during the simulated work cycle the angular range is varied, e.g. spread, in comparison with a normal work cycle, over which range—within the work cycle simulated about a machine axis with a rotational movement of the molds and with simultaneous cooling of all molds—the cooling medium is conveyed into each mold. During the normal work cycle, blow air is e.g. supplied only over a very small angular range and at a moderate throughput, whereas in the simulated work phase ambient air is permanently supplied, at a high throughput and for a relatively long time, up to maximally over a complete rotation. Furthermore, during cooling the delivery pressure of the cooling medium can be varied in comparison with a normal work cycle, for example to a considerable extent. For instance, the delivery pressure may be about 40 bar and 10 bar or may be varied in this pressure range.

The aforementioned method variants can also be combined with one another to make the cooling action as efficient as possible.

The same medium as is e.g. also used for blow molding can be used for the cooling operation. Alternatively, a different medium and even a liquid or a gas/liquid mixture can be used for cooling. If, during the simulated work cycle with empty molds, ambient air is used as for blow molding, the ambient air can then be cooled during the simulated work cycle, just like a liquid or aerosol-like cooling medium. The cooling medium is externally conveyed and supplied and may be a gas or a liquid or a gas/liquid mixture, e.g. an aerosol, to effect an even more intensive cooling action in the last-mentioned case, for instance by removal of evaporation heat via the mold cavity surface.

In the blow molding machine, particularly in a heat-set stretch blow-molding machine, the external supply of the cooling medium is connected to the stretching rod which can be introduced into the mold and which distributes the conveyed cooling medium in the mold cavity and over the mold cavity surface and expels it through the given space between the stretching rod and the mold.

Alternatively, the blow molding machine may comprise at least one additional conveying device which is connectable to the respective mold and its stretching rod, respectively, at least during a simulated work cycle and is used for conveying an externally supplied cooling medium that may be gaseous, liquid or gaseous and liquid.

Expediently, the blow molding machine is equipped such that the program routine for each simulated work cycle within one rotation varies the angular range of the medium delivery and/or the delivery pressure or the delivery rate in comparison with a normal work cycle, and/or stationarily stops the stretching rod at a predetermined cooling position in the mold at least substantially. This does not require any significant structural modifications of the blow molding machine, but this can be programmed comfortably at the control side.

To open an outflow path out of the mold, with the path having a cross-section as large as possible, and thus to permit a high throughput rate for the cooling medium at least during a simulated work cycle, the mold may have assigned thereto a relief valve which is operable at the control side or is responsive to pressure.

In a further alternative of the blow molding machine a separate efficient conveying device for a cooling medium, such as ambient air, which may be cooled, or cooling water, which may be cooled, or/and an aerosol-like cooling medium may be provided, as well as supply paths leading to the molds that are expediently equipped with large cross-sections and are possibly connected only for cooling so as to simultaneously cool all molds over their mold cavity surfaces in a permanent and efficient way during the simulated work cycle and with high throughput and/or high pressure.

BRIEF DESCRIPTION OF THE DRAWINGS

Embodiments of the subject matter of the disclosure shall now be explained with reference to the drawing, in which.

DETAILED DESCRIPTION OF THE PREFERRED EMBODIMENT

Figure 1:
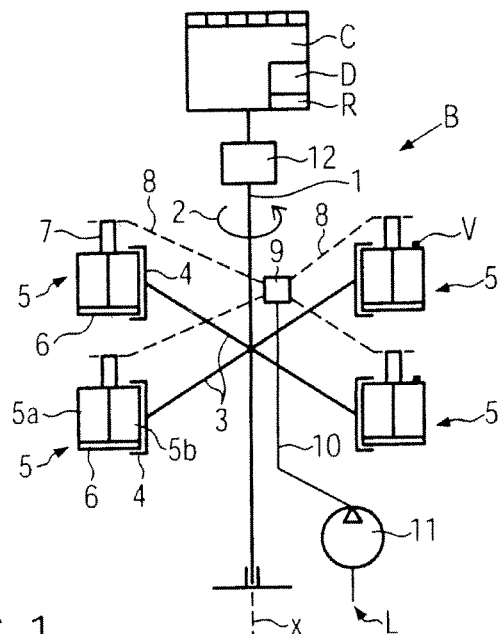
FIG. 1 is a schematic diagram of a blow molding machine with a plurality of molds.

FIG. 1 is a schematic diagram showing a blow molding machine B for producing plastic containers, such as PET bottles, from preforms, with the containers being continuously produced in normal work cycles of the blow molding machine B, and each work cycle including e.g. a rotation of the blow molding machine B over 360 degrees. Expediently, the blow molding machine B is a heat set type stretch blow molding machine for producing PET bottles for drinks to be filled in a hot state. This means that prior to start of production the molds of the blow molding machine B are heated up to a heat-set operating temperature of e.g. about 130° C. to 180° C. by means of temperature control devices (not shown) and by a heat carrier e.g. circulatingly conveyed through the molds in channels separated from the mold cavity, and are held at said temperature. In stretch blow molding, each preform is mechanically stretched in the blow molding process and blow molded in the mold while supplied with blow air.

If production in the blow molding machine B has to be changed over to a different product (different container or different bottle), the molds must be exchanged after cooling at the end of production; although the heat carrier can still circulate through the molds due to the temperature control devices, it can no longer be heated.

The blow molding machine B as shown in FIG. 1 is equipped with an additional forced-cooling device as compared with conventional blow molding machines of such types so as to minimize the waiting period for a mold change and the production loss associated therewith. Said forced-cooling device will also be explained in detail with reference to FIG. 3.

The blow molding machine B in FIG. 1 comprises a machine axis or shaft 1 which is rotatingly drivable by means of a rotary drive 12 in the direction of an arrow 2. Arms 3 carrying mold holders 4 and exchangeable molds 5 are mounted on the machine shaft 1. The machine shaft 1 defines an axis X about which the molds 5 are rotating during production in normal work cycles of e.g. 360 degrees, wherein each mold 5 is fed in an opened state with a preform (P in FIG. 2), the mold 5 is then closed, and a container, e.g. a bottle (F in FIG. 2), is blow molded from the preform P before the mold 5 is opened again and the bottle F is removed from the mold.

Figure 2:
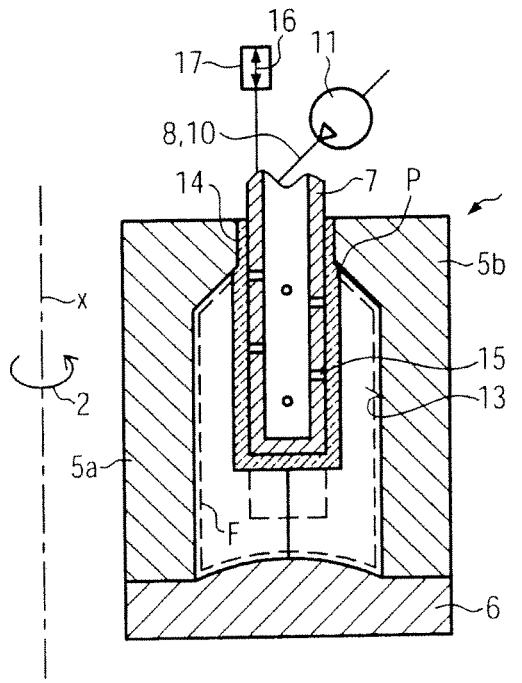
FIG. 2 is a section through a mold in a phase of a normal work cycle.

Each mold 5 consists for example of two folding mold halves (5a and 5b) and a movable bottom part 6 that jointly define the mold cavity 13, outlined in FIG. 2, with a mouth holding portion 14. If the bottles F are molded by stretch blow molding, each mold 5 has assigned thereto a stretching rod 7 that is hollow, comprises passages 15 and is linearly movable by means of an actuator 17 in the direction of the double-headed arrow 16 in the mold cavity 13. The actuator 17 may e.g. comprise a cam control (not shown) of the blow molding machine B.

FIG. 1 further illustrates connection lines 8 extending from a distributor 9 to the stretching rods 7 of the molds 5; the connection lines 8 are rotating with the molds 5 and are connected via a connection line 10 to a conveying device 11, e.g. a compressed-air controller or a compressor, which for blow molding the preforms P conveys ambient air L within a specific angular range of a rotation of the blow molding machine B selectively to the stretching rods 7.

The blow molding machine B comprises a computerized machine control C with a program section D that includes a program routine R for the operation of the forced-cooling device for preparing a conversion or changeover of the blow molding machine B through a mold change.

Figure 3:
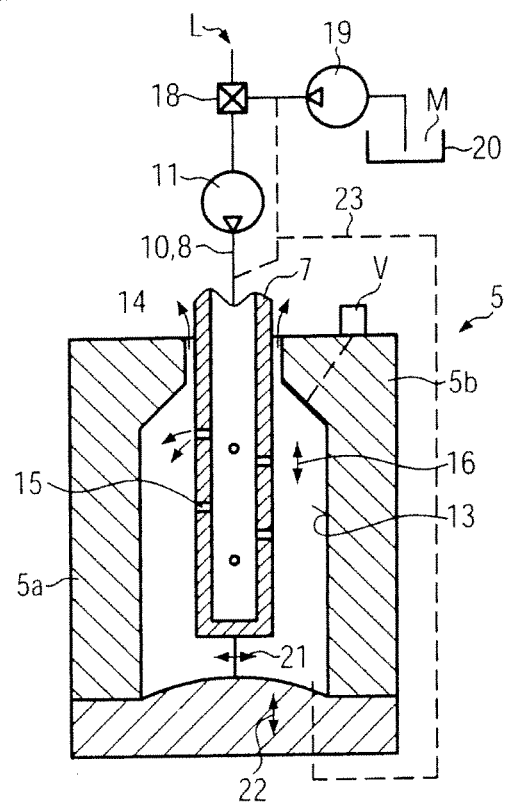
FIG. 3 is a section through the mold during a simulated work cycle for the forced cooling of the mold.

With the help of the program routine R at least one simulated work cycle is run after the end of production, through which cycle the empty molds 5 are moved about the machine axis X at a rotational speed reduced in comparison with the rotational speed during a normal work cycle. The molds 5 are here left in an empty state, i.e. preforms P are no longer inserted. The temperature control devices can be further operated, but the heat carrier is no longer heated. During the simulated work cycle ambient air L is permanently blown in by the conveying device 11 via the stretching rods 7 into the mold cavity 13 of all molds 5 at the same time so as to absorb heat from the mold cavity surface (FIG. 3). The heated air is blown out though a space Z between the stretching rod 7 and the mouth holding portion 14 of the mold 5.

The program routine R can be designed either such that the stretching rod 7 performs the linear movement in the direction of the double-headed arrow 16, which movement is also carried out in the normal work cycle, or that the stretching rod 7 is held substantially stationary at a predetermined optimal cooling position in the mold cavity 13 during the simulated work cycle.

Furthermore, the program routine R can be designed such that ambient air L is supplied over a total of 360 degrees of the machine rotation. The delivery pressure or the delivery rate can be varied in comparison with a normal work cycle, expediently enhanced and/or gradually increasing or decreasing.

In the illustrated process sequence, normal ambient air L is e.g. used for the forced cooling of the molds 5. The ambient air L could be cooled during the simulated work cycle so as to intensify the cooling effect. To achieve a throughput rate as high as possible during forced cooling, each mold 5 can additionally comprise at least one relief valve V that is either opened via the program routine R or is responsive to pressure. The forced cooling can also be continued within the simulated work cycle while the molds 5 are opened and closed again. Alternatively, the molds 5 could remain closed or could be opened only very little during the simulated work cycle.

FIG. 2 illustrates a phase of a normal work cycle in which the mold 5 rotates about the machine axis X in the direction of arrow 2 and the inserted preform P is held in the mouth holding portion 14 and on the introduced stretching rod 7. In this phase the preform P is still unmolded. The mold has already reached the heat-set operating temperature of about 130° to 180° C. In the further course of the normal work cycle (not shown), the stretching rod 7 (outlined in broken line) is first lowered to mechanically stretch the preform P. At the same time or in a lagging way blow air is introduced via the conveying device 11 and the supply line 8 so as to bring the preform P into the shape of the bottle F on the mold cavity surface 13 and to hold it until the bottle F has sufficiently solidified to be removed from the mold.

FIG. 3 illustrates the sequence during a simulated work cycle for the additional forced cooling of the empty mold 5. The stretching rod 7 is moved in the direction of the double-headed arrow 16 as in the normal work cycle while ambient air L is permanently blown in by the conveying device 11 and via the supply line 8, the ambient air L acting on the mold cavity surface 13 and flowing off through the space Z out of the mold 5. Optionally, air is also discharged out of the mold cavity 13 through the relief valve V, which is then opened. Furthermore, it is optionally possible to open the mold 5 at least temporarily, as outlined by arrows (21 and 22), with the forced cooling being not interrupted in this process.

Alternatively, FIG. 3 outlines a reservoir 20 for a different or a liquid cooling medium M, e.g. cooling water, which is conveyed via the conveying device 11 into the mold 5 during the simulated work cycle; a switch valve 18 could here block the supply of ambient air L. As a further alternative, a further conveying device 19 (a compressor or a pump) could be provided for conveying the cooling medium (e.g. cooling water M) via the supply line 9 during the simulated work cycle simultaneously into the mold cavities 13 of all molds 5.

The forced cooling could also be carried out with a mixture of ambient air and cooling water (e.g. as aerosol).

As a further alternative, a separate supply line 23 is illustrated in broken line, the supply line 23 leading from the further conveying device 19 to an inlet into the mold cavity 13 or to the stretching rod 7; via said supply line 23 the medium can be supplied externally during the simulated work cycle with empty mold 5 and e.g. discharged via the relief valve V. This could be employed in heat set molds 5 that are operated without stretching rods 7, but can also be used if the stretching rod 7 is employed.

In the last-mentioned case the mold cavity 13 can be force-cooled, if necessary, via the supply line 23 and also the supply line 8, and heat can be discharged from the mold cavity surface 13 so a to cool the mold 5, in comparison with the heat-set operating temperature, to a temperature which is acceptable for the mold change and ranges from about 60° C. to 40° C., and to shorten the waiting period up to mold change and also the changeover of the blow molding machine B as much as possible.

In standard heat-set stretch blow-molding machines the cooling period for cooling the molds to about 60° C. solely by utilizing the heat carrier, which is fed by the temperature control device and no longer heated, lasts for at least half an hour, and more than one hour in the case of cooling to about 40° C. With the forced cooling according to the disclosure it is possible to half this period or even to shorten it further. The disclosure also contemplates that the cooling medium L, M is simultaneously applied into all mold cavities via separate supply paths only during each simulated work cycle. Alternatively, the molds could be connected only for the forced cooling of the mold cavity surfaces to supply lines only intended for this purpose and to at least one conveying device and during the cooling period the blow molding machine could be stopped. The heat carrier can, but need not, be circulated by the temperature control devices. Optionally, the heat carrier is cooled during forced cooling even in addition.

The invention claimed is:

1. A method for converting a blow molding machine for producing plastic containers from preforms by blow molding in container-producing normal work cycles in a plurality of exchangably-installed blow molds, the blow molding machine having a plurality of molds which are rotatingly movable during a normal work cycle and heated to a heat-set operating temperature, each blow mold being adjustable between open and closed states and defining at least one mold cavity having internal mold cavity surfaces and converting the blow molding machine by a mold change of the plurality of blow molds, the method comprising carrying out at least one simulated work cycle with the plurality of blow molds in an empty state for preparing the mold change in the blow molding machine, externally supplying and during the at least one simulated work cycle conveying a cooling medium at least substantially at the same time through all of the mold cavities of the plurality of blow molds and cooling the blow molds by the externally supplied cooling medium with respect to the heat-set operating temperature by heat discharge from the mold cavity surfaces.

2. The method according to claim 1, wherein the blow molds in the closed state and in the empty state are included in the blow molding machine, the blow molding machine formed as a stretch blow molding machine having a stretching rod for each mold cavity, the stretching rod being introducible into the respective mold cavity during the at least one simulated work cycle, and wherein the method further comprises introducing the cooling medium through the stretching rod into the mold cavity of the blow mold, and discharging the cooling medium out of the blow mold.

3. The method according to claim 2, and holding the stretching rod substantially stationary at a predetermined cooling position during the simulated work cycle relative to a stretching rod movement controlled in a normal work cycle with a preform in the blow mold.

4. The method according to claim 2, and moving the stretching rod in the mold for cooling the blow mold during the simulated work cycle as in a normal work cycle.

5. The method according to claim 1, and carrying out the simulated work cycle during cooling of the blow molds by conveying the cooling medium through the mold cavities at a rotational speed of the blow molds in the blow molding machine that is slower in comparison with the rotational speed during a normal work cycle.

6. The method according to claim 1, and, during cooling of the blow molds during the simulated work cycle, varying an angular range in comparison with a normal work cycle over which angular range the cooling medium is simultaneously conveyed into the blow molds within the simulated work cycle with a rotational movement of the blow molds about a machine axis.

7. The method according to claim 1, and during cooling by conveying the cooling medium through each mold cavity with a certain conveying pressure, the conveying pressure of the cooling medium is varied in comparison with the conveying pressure of the cooling medium during a normal work cycle.

8. The method according to claim 1, wherein the cooling medium conveyed into the blow mold during the simulated work cycle is one of the medium also used in the normal work cycle for blow molding a preform and/or for purging, a medium differing therefrom, a medium having a lower temperature than the medium conveyed during the normal work cycle, or a combination thereof.

9. The method according to claim 1, wherein the cooling medium is one of a gas, a liquid, or a gas/liquid mixture.

10. The method according to claim 2, wherein discharging the cooling medium out of the mold cavity comprises one of discharging through a space formed in the blow mold in the empty state between the stretching rod and the mold cavity, discharging via at least one relief valve out of the mold cavity, discharging out of the mold cavity in an at least partly opened state of the blow mold, and discharging out of a combination thereof.

11. The method of claim 5, wherein the slower rotational speed of the rotating blow molds comprises not more than about 50 degrees over 360 degrees of a rotation during a normal work cycle.

12. The method claim 6, wherein varying the angular range comprises enlarging the angular range.

13. The method of claim 7, wherein varying the conveying pressure comprises raising the conveying pressure to a pressure range between 40 bar and 10 bar.

14. The method of claim 9, wherein the cooling medium is one of ambient air, cooled ambient air, cooling water, cooled cooling water, or a gas/liquid mixture in aerosol form.

* * * * *